United States Patent

[11] 3,608,685

[72] Inventor Glenn W. Childress
 1480 Sumac Ave., Boulder, Colo. 80302
[21] Appl. No. 881,496
[22] Filed Dec. 2, 1969
[45] Patented Sept. 28, 1971

[54] SELECTIVE DRIVE HUB CLUTCH
 6 Claims, 4 Drawing Figs.
[52] U.S. Cl................... 192/94,
 192/65, 192/67, 192/70.15, 192/95, 192/108,
 287/53 SS
[51] Int. Cl.........................F16d 15/00,
 F16d 17/00, F16d 23/04
[50] Field of Search............................ 192/94, 65,
 95, 56, 67, 97, 66, 108; 64/30 A; 287/53 SS

[56] References Cited
 UNITED STATES PATENTS
2,844,238  7/1958  Peterson...................... 192/94

Primary Examiner—Mark M. Newman
Assistant Examiner—W. E. Olsen
Attorney—McGrew and Edwards ABSTRACT: A selective drive clutch for the front wheels of four-wheel drive vehicles comprises inner and outer clutch members having frustoconical interengageable toothed surfaces which are moved into and out of engagement by a closure cap threaded on the outer member, the outer member being securely attached as a hub on the wheel to be driven. A ball bearing assembly or the like mounted on the inner member constitutes an end bearing for the vehicle drive axle when the clutch is disengaged. The entire assembly is locked together by two snap rings one retaining the bearing in the inner member and the other locking the closure cap to the bearing assembly.

INVENTOR
GLENN W. CHILDRESS
ATTORNEYS

SELECTIVE DRIVE HUB CLUTCH

This invention relates to selective drive hubs employed on the front wheels of four-wheel drive vehicles and particularly to an improved and simplified construction for such hubs.

Many types of selective drive hubs for front wheels of four-wheel drive vehicles have been provided heretofore; these hub mechanisms have included selective devices of various kinds for changing the hub connection from one which affords free wheeling of the wheel to one which provides a direct connection between the driving axle and the wheel. Among the selective devices employed are caps or closures for the hub which are caps or closures for the hub which are rotated between two selecting positions and are connected in various ways to the control mechanism of the hub. While many of these selective hub constructions have provided satisfactory service over extended periods of time, they have been of relatively complicated construction and have not been entirely satisfactory for all applications. Accordingly, it is an object of the present invention to provide an improved selector hub for four-wheel drive vehicles which comprises few parts and is easy to assemble and to operate.

It is another object of this invention to provide an improved selective drive clutch mechanism for the front wheels of four-wheel drive vehicles.

Briefly, in carrying out the objects of this invention, in one embodiment thereof, an outer hub member is provided which is readily attached to the vehicle wheel. This member is provided with an internal frustoconical surface and an internal member having a complementary frustoconical surface is provided with a central opening for engagement with the splined axle of the vehicle. For positive engagement, both surfaces are provided with interengageable elongated flutes or teeth. A ball bearing assembly is mounted in the outer end of the inner member and a cap threaded on the outer member acts as a closure for the hub and is provided with a central stub shaft which passes through the inner ring of the bearing assembly and is anchored in position by a snapring mounted in an annular groove in the end of the shaft. The bearing assembly is retained in position on the inner member by a snapring mounted in an internal annular groove near the end of the inner member. These two snaprings are the sole elements required for holding the hub assembly together. The selection between the engaged and disengaged positions of the clutch is effected by rotating the cap to the respective one of its extreme positions of rotation on the hub.

The features of novelty which characterize this invention are pointed out with particularity in the claims annexed to and forming a part of this specification. The invention itself, however, both as to its organization and manner of operation, together with further objects and advantages thereof, will best be understood by reference to the following description taken in connection with the accompanying drawings in which:

Figure 1:
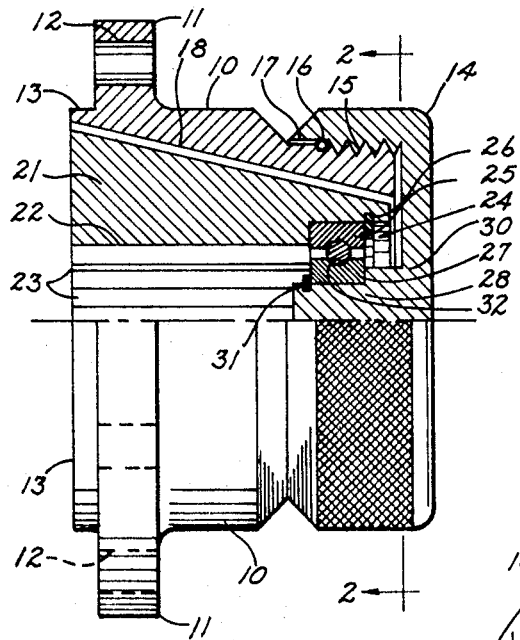
FIG. 1 is a side elevation view of a front wheel hub embodying the invention shown partly in section and illustrating the disengaged position of the clutch.
Figure 2:
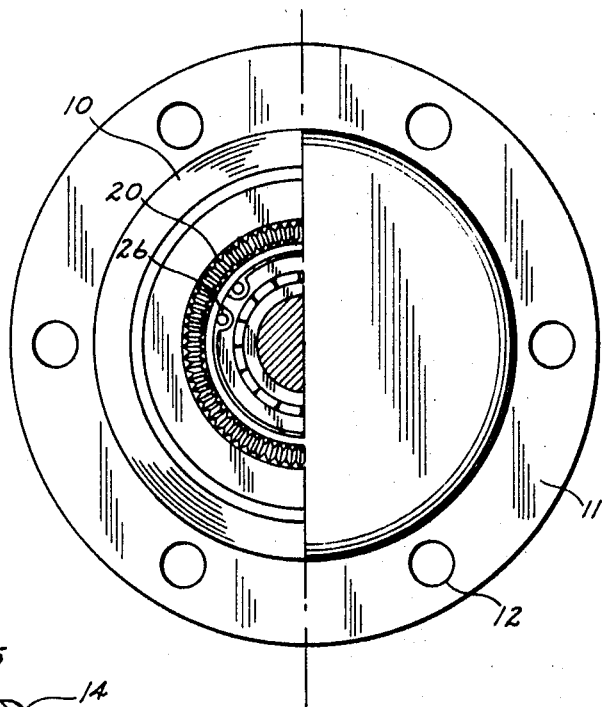
FIG. 2 is an end elevation view of the hub of FIG. 1.

Referring now to the drawings, the hub cap assembly as illustrated in FIGS. 1 and 2 comprises a hub housing 10 having a flange 11 whereby it may be secured to a vehicle wheel by means of bolts passed through openings 12 equally spaced about the flange. The hub 10 is also provided with a rim portion 13 of about the same diameter as the main housing 10 and which extends inwardly for affording a shoulder to fit the central wheel opening.

The housing 10 is closed by a cap 14 secured on the housing by threads 15. A seal is provided between the cap 14 and the housing 10 by an O-ring 16 seated in a groove in the housing and engaging the cap 14 along a smooth cylindrical portion of the cap indicated at 17 and which is slightly spaced radially from the housing 10. The internal walls of the housing 10 are of frustoconical configuration, and, as indicated at 18, this inner wall surface is provided with teeth 20 indicated in FIG. 2. The teeth extend the length of the frustoconical surface and are of triangular cross section increasing in cross section from the small end of the conical section to the large end thereof, thus the teeth are uniformly continuous over the length of the internal surface of the housing member 10.

In order to connect the housing 10 to the splined end of the drive shaft of a four-wheel drive vehicle, an internal clutch member 21 is provided, the outer surface of which is of frustoconical configuration and has teeth equal in number and complementary to those on the wall 18 of the external member. The member 21 is provided with a central cylindrical passage 22 which is provided with splines or the like indicated at 23 which will engage the splines on the outer end of the vehicle drive axle and provide a positive drive between the axle and the member 21 while affording sliding axial movement of the member 21 on the axle. A bearing assembly 24 is mounted in a seat in the smaller end of the member 21, the seat comprising an enlarged portion of the passage 22 and being of a shape to receive an outer race or retainer ring 25 of the assembly 24. The ring 25 is securely locked in position on the seat by a snapring 26 which fits in a complementary groove in the member 21 immediately adjacent the bearing ring 25. An inner race or retainer ring 27 of the bearing assembly 24 is seated on a stub shaft 28 which extends inwardly from the cap 14 and is an integral part thereof. Shaft 28 has a shoulder 30 which provides a seat for the inner bearing ring 27 and the ring is securely locked in this seat by a snapring 31 seated in an annular groove in the outer end of the stub shaft 28. The bearing assembly 24 as illustrated is of the ball bearing-type and has a multiplicity of ball bearings 32 spaced in the usual manner about the retaining rings.

When the cap 14 is in the position illustrated in FIG. 1, it is in its extreme inner position and is securely locked against the hub 10. In this position, the member 21 is spaced from the external member 10 and is free to rotate about the stub shaft 28. When the end of a vehicle axle engages the splines 23 the bearing assembly 24 thus provides an outer bearing for the axle.

Figure 3:
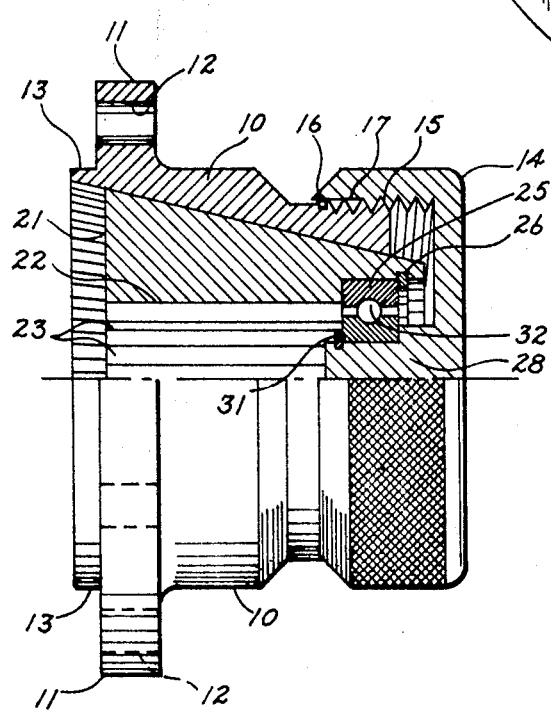
FIG. 3 is a side elevation view similar to that of FIG. 1 illustrating the clutch in its engaged position.

When the cap 14 is rotated away from the position of FIG. 1, it moves axially with respect to the hub 10 and can be rotated until it reaches its extreme position as illustrated in FIG. 3. This extreme position is determined by full engagement of the toothed conical surfaces of the members 10 and 21 and will be readily apparent that the cap 14 cannot be further rotated. The engagement of the teeth of the members 10 and 21 provides a positive drive between an axle seated in the member 21 and the hub 10 and thereby provides the driving engagement of the axle and the wheel. The O-ring 16 maintains sealing engagement with the housing 10 and cap 14 throughout the movement of the cap from its position in FIG. 1 to its position in FIG. 2.

The cap 14 is provided with a knurled or otherwise suitably roughened surface to facilitate its being turned by hand.

Figure 4:
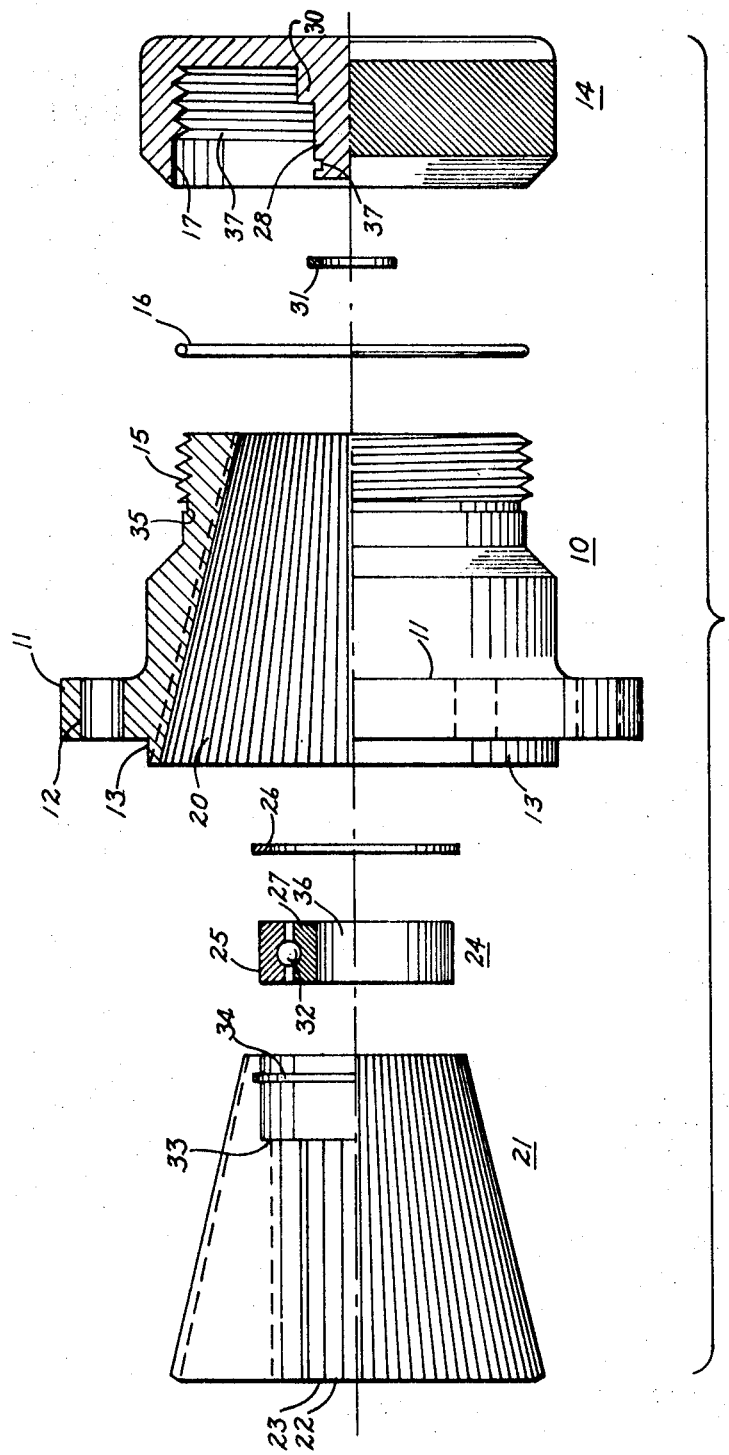
FIG. 4 is an exploded side elevation view of the hub of FIG. 1.

The simplicity of the selective drive hub assembly of FIG. 1 is readily apparent from the exploded view FIG. 4. The seat for the bearing assembly 24 is clearly shown at 33 and the internal annular groove for receiving the snapring 26 at 34; during the assembly the bearing assembly 24 is first seated in the member 21 and the snapring 26 secured in place. The member 21 is then inserted in the internal frustoconical passage of the housing 10, the O-ring 16 is seated on the housing in its annular groove indicated at 35 and the cap 14 is then aligned with the housing and moved toward the member 21, the unthreaded portion 17 affording the seating of the rim of the cap 14 on the threads 15 and the stub shaft 28 is seated within the internal passage of the bearing assembly indicated at 36, the threads 15 are then engaged by the threads of the cap 14 indicated at 37 and the cap is screwed into position until the shaft 28 emerges from the bearing assembly a distance sufficient to expose an annular groove 37. The snapring 31 is then inserted in its seat which is the groove 37, this being done through the open passage 22 in the member 21, tools suitable for engaging and disengaging the snapring being employed in the usual manner and being easily operated through the space provided by the axial passage 22. The assembly is now complete and it will be clearly seen that the two snaprings constitute the entire attaching mechanism and that by turning the cap 14 the member 21 may be moved between its two extreme positions illustrated in FIGS. 1 and 2 wherein the selective drive is disengaged in FIG. 1 and engaged in FIG. 2. The ease of assembly of the hub and its moving parts makes it very easy to clean and to service the mechanism. The arrangement of the teeth extending the length of the two frustoconical surfaces assures positive power-transmitting engagement in a position of FIG. 3 and free rotation of the axle and member 21 in which it is inserted when the internal and external members of the clutch are disengaged as shown in FIG. 1, the bearing assembly 24 then acting as an outer bearing for the axle.

I claim:

1. A clutch assembly for effecting a driving connection between a freely rotatable vehicle wheel and a concentric drive shaft having a splined end, a hub member having an axial passage therethrough of frustoconical configurations, means for attaching said hub member to the vehicle wheel, an internal member of frustoconical configuration complementary to that of said axial passage, said internal member having an axial bore therethrough a configuration to fit the splined shaft for axial sliding movement and being axially movable into engagement with the walls of said axial passage of said hub member, a bearing assembly having inner and outer bearing races and bearings engaging said races and being rotatable therebetween, means for mounting said bearing assembly at one end of said internal member concentric with the axis thereof, said inner race having a concentric cylindrical passage therethrough, readily detachable means for locking said bearing assembly in said mounting means, a closure cap threaded on said hub member on the end thereof adjacent said bearing assembly, a central stub shaft in said cap extending inwardly and through the opening in said inner race whereby said bearing provides an outer bearing for the concentric drive shaft when said members are disengaged, a readily detachable locking element for preventing withdrawal of said stub shaft from said inner race whereby axial movement of said cap on turning thereof moves said internal member axially with respect to said hub member between an engaged position and a disengaged position of said members.

2. A clutch assembly as set forth in claim 1, wherein both said readily detachable locking means are snaprings and said internal member and said stub shaft have respective annular grooves for seating said rings.

3. A clutch assembly as set forth in claim 1, wherein said means for mounting said bearing assembly comprises an enlarged concentric portion of said axial bore.

4. A clutch assembly as set forth in claim 3, wherein said bearing assembly is mounted in the smaller end of said internal member whereby free wheeling of the wheel is effected when said cap is turned into full engagement with said hub and is positioned in its minimum axial extension position.

5. A clutch assembly as set forth in claim 1, including a gasket seat formed in said hub member adjacent the threaded portion thereof for providing a seal to prevent the admission of foreign matter to the interior of said hub, said cap having a smooth cylindrical interior wall of a diameter to pass over said threads and maintain sealing engagement with said O-ring during movement of said cap.

6. A clutch assembly as set forth in claim 1, including teeth extending axially along the adjacent surfaces of said members, said teeth interfitting over a major portion of their length when said members are in their engaged position.